March 17, 1936.     E. W. STACEY     2,034,062
DRIVING MECHANISM
Original Filed Feb. 1, 1932
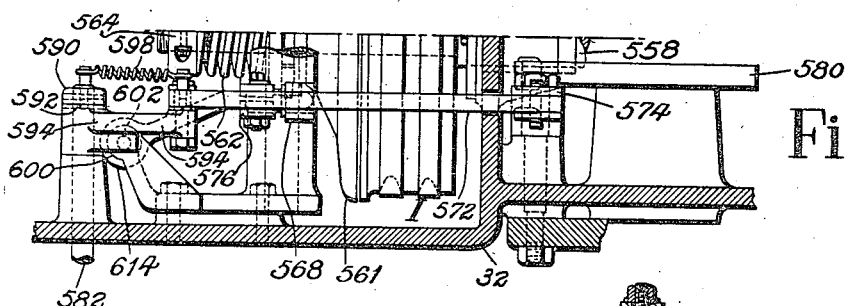
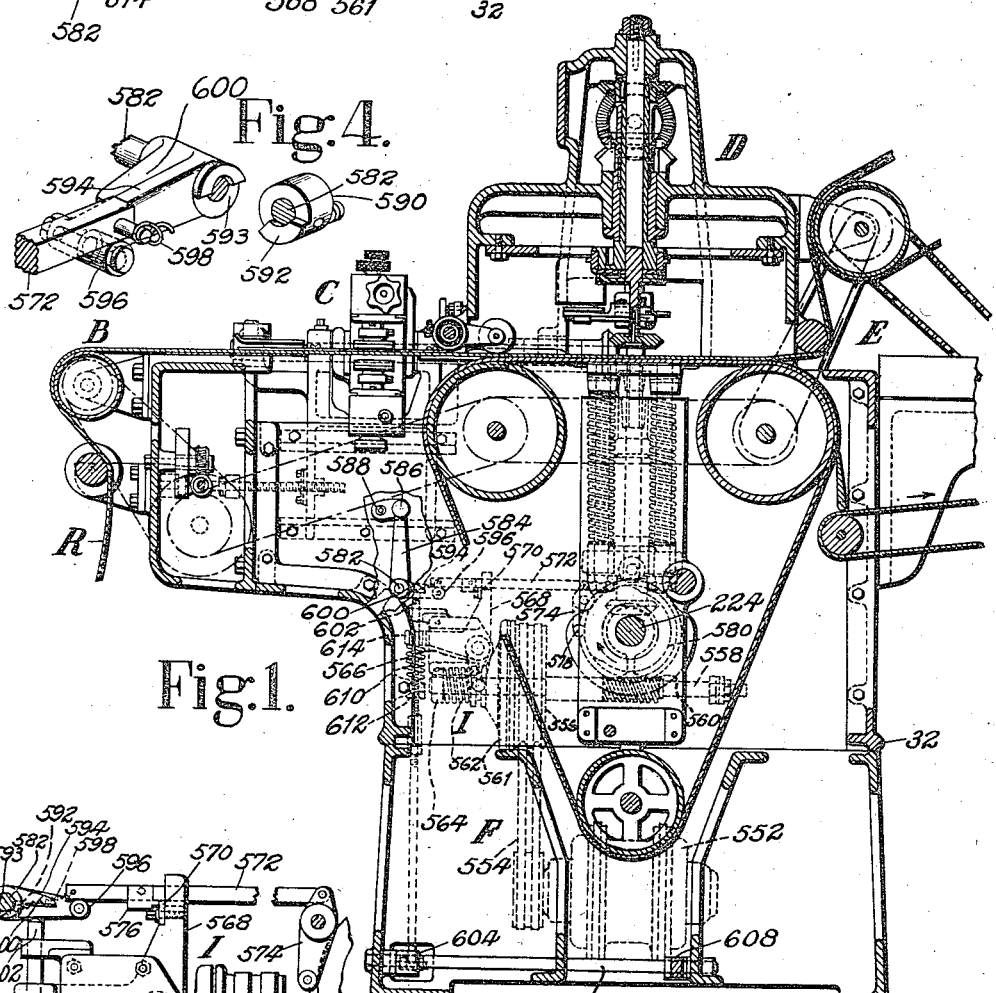
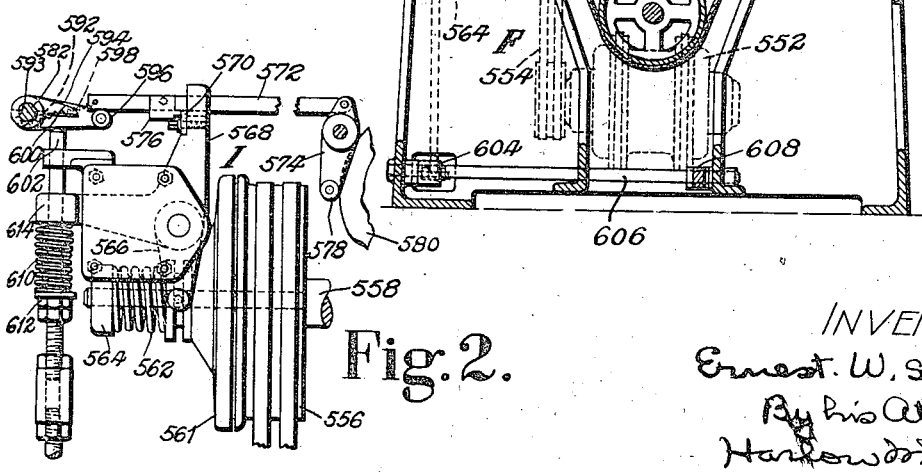
INVENTOR
Ernest W. Stacey
By his Attorney
Harlow M. Davis Patented Mar. 17, 1936

2,034,062

UNITED STATES PATENT OFFICE 2,034,062

DRIVING MECHANISM

Ernest W. Stacey, Beverly, Mass., assignor to United Shoe Machinery Corporation, Paterson, N. J., a corporation of New Jersey Original application February 1, 1932, Serial No. 590,109. Divided and this application April 3, 1933, Serial No. 664,189

19 Claims. (Cl. 192—83)

My invention relates to mechanisms through which power may be transmitted to a machine to be operated and the application of the driving force governed. The subject-matter herein presented has been divided from an application filed in my name in the United States Patent Office on February 1, 1932, Serial No. 590,109, and directed to Apparatus for operating upon rubber-stock and like material.

In sole-cutting apparatus of the character disclosed in the parent application, it is desirable that single operating cycles may be performed under power, as for the purpose of testing, or that continuous operation in successive cycles may be had for the production of work. An object of this invention is to provide for such driving of a machine by simple mechanism readily controlled by the operator. For the attainment of this object, there is combined with the driving shaft of a machine to be operated and a clutch for rotating the shaft, two operator-controlled members for governing the engagement and disengagement of the clutch, through a unitary member, one operator-controlled member being provided with means for securing it in either position for engagement or for disengagement, and the other member having means for normally maintaining it in an ineffective position. The movement of the first of these members may be in opposite directions, while the second moves to the engaging position and then farther for disengagement. The first-mentioned member conveniently governs the action of the machine shaft for the production of successive operating cycles. The second may be employed for the single-cycle operation, there being included in this connection automatic means for disengaging the clutch after the actuation of said second member has initiated a cycle. Because continued movement of this second member in the same direction disengages the clutch, it may be effectively utilized for the quick or emergency stopping of the machine shaft, and it also enables the operator to gradually turn over the shaft and bring it to rest at any intermediate point in a cycle to facilitate the making of adjustments. In the illustrated embodiment of the invention, there appears means, such as a spring, for causing the engagement of the clutch, a lever or like member for disengagement of the clutch against the force of the engaging means, and a latch for holding the member in its disengaging position. This latch may not only exercise a retaining function but is also preferably capable of movement, as by means such as a cam operable by the machine, to produce the separation of the clutch elements for single-cycle operation. Two operator-controlled members are shown for releasing the latch. One of these may, after such release and the consequent starting of the machine, act through a spring, which has been compressed during its initial movement, to shift the disengaging member and separate the clutch to stop the machine.

In the accompanying drawing,

Fig. 1 is a vertical longitudinal section through a machine for cutting and embossing rubber soles, to which machine my improved driving mechanism is applied;

Fig. 2, an enlarged, broken side elevation of said mechanism;

Fig. 3, a partial plan view of the mechanism; and

Fig. 4, a perspective view of a portion of the latching means for the clutch-lever, elements being shown as separated.

There is indicated in Fig. 1, mounted upon a frame 32, intermittently acting feeding mechanism B for rubber stock R, embossing mechanism C, cutting mechanism D, and sole- and scrap-delivering mechanism E. These may be as in the previously-mentioned parent application. None of the structural details is of consequence in connection with the present invention.

Power for operating the feeding mechanism, embossing mechanism, cutting mechanism and delivering mechanism is applied to an operating shaft 224 from driving mechanism F. This driving mechanism includes controlling means which allows the apparatus to be operated uninterruptedly to cut successive soles from the web without attention on the part of the operator, to perform a single operating cycle and thus cut one sole from the web, to be inched or actuated gradually through a partial cycle or more to facilitate setting or adjustment, and to be instantly stopped during operation in any manner. There is supported upon the lower portion of the frame 32 an electric motor 552 with its shaft joined by belt-gearing 554 to a pulley 556 normally free to turn upon a shaft 558 journaled in the frame below and at right angles to the shaft 224, to which it is connected by worm-gearing 560. The outer face of the pulley 556 furnishes one member of a friction-clutch I. The other member is shown as a disk 561 splined to move along the shaft 558, there being a spring 562 interposed between the disk and a collar 564 adjustable upon the outer extremity of the shaft, which spring, unrestrained, causes the driving engagement of the clutch and consequent rotation of the shaft 224. A peripherally slotted hub of the disk 561 is engaged by the forked lower end of a three-armed lever 566 fulcrumed upon the frame. An upwardly extending arm 568 of the lever may be engaged at 570 by a latch-bar 572 to hold the clutch I open against the action of the spring 562. The latch-bar is pivotally supported upon a lever 574 turning upon the frame and is provided with an adjustable contact-piece 576 for engagement with the clutch-lever 566. A roll 578 upon the lower end of the lever 574 has contacting with it a cam 580 secured upon the shaft 224. Under the influence of the high portion of the cam, the latch-bar, by drawing its piece 576 against the lever-portion 570, acts to move the upper end of said lever to the right (Fig. 1), disengaging the clutch and stopping the apparatus. Because the cycle is terminated with the high portion of the cam in contact with the roll 578, the latched relation, with the apparatus at rest, is maintained until the clutch-lever is freed by the operator. For this purpose and to cause continuous operation of the apparatus, a spindle 582 is arranged to turn transversely of the frame. At the operator's side of the apparatus, the spindle has fast upon it a crank 584 movable to opposite clutch-engaging and clutch-disengaging positions. The crank has a retaining pin 586, which in the opposite positions may engage one of two openings 588 in the frame. At the opposite extremity of the spindle from the crank-arm, there is fixed a collar 590, from which is an inward projection 592 entering a depression 593 somewhat extended circumferentially in the adjacent side of the hub of a lever 594 fulcrumed to turn on the spindle 582. This lever may be turned anti-clockwise (Fig. 1) when the crank 584 is shifted from right to left. The movement forces a roll 596 upon the lever into contact with the under side of the latch-bar 572, raising it against the tension of a spring 598 extending between the bar and the collar 590. The portion 576 of the bar is thereby lifted away from the clutch-lever portion 570, freeing the lever and permitting the spring 562 to cause the engagement of the clutch I. Since, as long as the crank 584 is held at the left-hand opening 588 the latch-bar 572 is elevated, the clutch-releasing and latching element 576 can not contact with the lever-portion 570, the cam 580 is ineffective, and the apparatus continues to perform successive operating cycles.

To produce a single operating cycle only of the apparatus, there is arranged for contact with a short arm or lateral offset 600 from the lever 594 the upper end of a rod 602 guided for vertical reciprocation in the frame and articulated at its lower extremity to an arm 604 projecting from a shaft 606 turning at the bottom of the frame 32 and having secured to it a treadle 608. Surrounding the rod 602 and acting to depress it is a spring 610 interposed between a collar 612 adjustable along the rod and a horizontal arm 614 of the lever 566, through an opening in which arm the rod passes. The character of the spring 610, it being weaker than the spring 562, is such that the rod 602 may be raised from its normal ineffective position without affecting the clutch I until said rod strikes the lever-arm 600. Although the crank-arm 584 is at this time secured in the non-operating position, the lever 594 may be moved by this contact because of the extent of the depression 593, in which the less angularly extended projection 592 may remain at rest.

The lever 594 therefore lifts the latch-bar 572 to carry the contact-portion 576 away from the lever-portion 570. This unlatches the lever 566, allowing the spring 562 to establish engagement between the sections of the clutch I and starting the apparatus in operation. The lever-portion 570 now lies beneath the bar-portion 576. If, having done this, the operator releases the treadle, the apparatus will complete its cycle, during which the low section of the cam 580 will so free the lever 574 that the spring 598 may shift the lever-roll 578 to the right (Fig. 1), the bar-portion 576 moving to the left of the lever-portion 570. As the cycle is completed, the high section of the cam, acting upon the roll 578, swings the lever 574 clockwise, and the bar-portion 576, now contacting with the side of the lever-portion 570, turns the clutch-lever 566 clockwise. This opens the clutch and the apparatus stops. If at any time the operator wishes to discontinue the operation of the apparatus, he fully depresses the treadle 608, raising the rod 602 through a greater distance than for its clutch-engaging action. Although this unlatches the clutch-lever 566, it also compresses the spring 610 to such an extent that it offers greater resistance than the spring 562. Consequently, pressure of the spring 610 against the lever-arm 614 turns the lever 566 clockwise to disengage the clutch, regardless of how its operation was initiated or what point in the cycle has been reached. When the treadle is released, provided the crank 584 is not set for continuous operation, the apparatus will complete any portion of a cycle which may have begun, and will then be stopped by the action of the cam 580. If the operator wishes to turn the apparatus over gradually, this may be accomplished by causing the treadle to move between the position in which the clutch I is fully disengaged and that at which the spring 562 may establish driving engagement.

Having described my invention, what I claim as new and desire to secure by Letters Patent of the United States is:

1. The combination with a shaft of a machine to be operated, of a clutch through which the shaft may be driven, shifting means for the clutch, a member movable by the operator in opposite directions for governing the engagement and disengagement of the clutch, and a second member movable by the operator to govern the engagement of the clutch and movable farther to govern the disengagement of the clutch.

2. The combination with a shaft of a machine to be operated, of a clutch through which the shaft may be driven, a member movable by the operator in opposite directions for governing the engagement and disengagement of the clutch, a second member movable by the operator to govern the engagement of the clutch and movable farther to govern the disengagement of the clutch, and an automatic means for disengaging the clutch after movement of the second member to the engaging position.

3. The combination with a shaft of a machine to be operated, of a clutch through which the shaft may be driven, means for engaging the clutch to rotate the shaft, a member movable to disengage the clutch against the force of the engaging means, a member movable through different distances, the member upon movement of one extent governing the action of the engaging means and upon movement of another extent governing the disengaging member, and a yieldable member through which the last-mentioned effect is transmitted.

4. The combination with a shaft of a machine to be operated, of a clutch through which the shaft may be driven, means for engaging the clutch to rotate the shaft, a member movable to disengage the clutch against the force of the engaging means, a member movable to govern the action of the engaging means, and a movement-transmitting spring interposed between said governing member and the disengaging member.

5. The combination with a shaft of a machine to be operated, of a clutch through which the shaft may be driven, means for engaging the clutch to rotate the shaft, a member movable to disengage the clutch against the force of the engaging means, and an operator-controlled member movable through different distances, the member upon movement of one extent governing the action of the engaging means and upon movement of another extent governing the disengaging member, and means operable by the machine for nullifying the effect of the operator-controlled member upon the engaging means.

6. The combination with a shaft of a machine to be operated, of a clutch through which the shaft may be driven, means for engaging the clutch to rotate the shaft, a member movable to disengage the clutch against the force of the engaging means, and an operator-controlled member movable through different distances, the member upon movement of one extent governing the action of the engaging means and upon movement of another extent governing the disengaging member, and a second operator-controlled member for governing the engaging means.

7. The combination with a shaft of a machine to be operated, of a clutch through which the shaft may be driven, means for engaging the clutch to rotate the shaft, a member movable to disengage the clutch against the force of the engaging means, a latch for holding the member in disengaging position, and means for moving the latch to release the member for movement and to move said member oppositely to that upon release.

8. The combination with a shaft of a machine to be operated, of a clutch through which the shaft may be driven, means for engaging the clutch to rotate the shaft, a member movable to disengage the clutch against the force of the engaging means, a latch for holding the member in disengaging position, and means movable through different distances by the operator for first releasing the latch and thereafter moving the member.

9. The combination with a shaft of a machine to be operated, of a clutch through which the shaft may be driven, means for engaging the clutch to rotate the shaft, a member movable to disengage the clutch against the force of the engaging means, a latch for holding the member in disengaging position, and a plurality of members each independently movable by the operator to move and thus separately release the latch.

10. The combination with a shaft of a machine to be operated, of a clutch through which the shaft may be driven, means for engaging the clutch to rotate the shaft, a member movable to disengage the clutch against the force of the engaging means, a latch for holding the member in disengaging position, and a plurality of members independently movable by the operator for releasing the latch, one of said members being arranged to first release the latch and thereafter shift the disengaging member.

11. The combination with a shaft of a machine to be operated, of a clutch through which the shaft may be driven, a spring for engaging the clutch, a lever for disengaging the clutch against the force of the spring, a member for movement by the operator to actuate the lever, a spring through which the member acts upon the lever and controlling means for the clutch into engagement with which the member comes during compression of the spring.

12. The combination with a shaft of a machine to be operated, of a clutch through which the shaft may be driven, a spring for engaging the clutch, a lever for disengaging the clutch against the force of the spring, a member movable by the operator to produce movement of the lever, and a latch for holding the lever in disengaging position, the member being arranged to release the latch.

13. The combination with a shaft of a machine to be operated, of a clutch through which the shaft may be driven, a spring for engaging the clutch, a lever for disengaging the clutch against the force of the spring, a member for movement by the operator to actuate the lever, a latch for holding the lever in disengaging position, and a lever movable in contact with the latch under the influence of the operator-controlled member.

14. The combination with a shaft of a machine to be operated, of a clutch through which the shaft may be driven, a spring for engaging the clutch, a lever for disengaging the clutch against the force of the spring, a member for movement by the operator to actuate the lever, a latch for holding the lever in disengaging position, a lever movable in contact with the latch under the influence of the operator-controlled member, and a second operator-controlled member acting upon the latch.

15. The combination with a shaft of a machine to be operated, of a clutch through which the shaft may be driven, a spring for engaging the clutch, a lever for disengaging the clutch against the force of the spring, a member movable by the operator to produce movement of the lever, a latch for holding the lever in disengaging position, and means for moving the latch to cause the lever to be shifted.

16. The combination with a shaft of a machine to be operated, of a clutch through which the shaft may be driven, means for engaging the clutch to rotate the shaft, a member movable to disengage the clutch against the force of the engaging means, a movable governing member for the disengaging member, a rotatable spindle, a lever free to turn upon the spindle and engaging the governing member, the lever and spindle having surfaces which may contact to actuate the lever, and means for turning the lever upon the spindle.

17. The combination with a shaft of a machine to be operated, of a clutch through which the shaft may be driven, means for engaging the clutch to rotate the shaft, a member movable to disengage the clutch against the force of the engaging means, a movable governing member for the disengaging member, a rotatable spindle, a crank for rotating the spindle, a lever free to turn upon the spindle and engaging the governing member, the lever and spindle having surfaces which may contact to actuate the lever, and a treadle-actuated rod engaging the lever.

18. The combination with a shaft of a machine to be operated, of a clutch through which the shaft may be driven, means for engaging the clutch to rotate the shaft, a member movable to disengage the clutch against the force of the engaging means, a movable governing member for the disengaging member, a rotatable spindle, a lever free to turn upon the spindle and engaging the governing member, the lever and spindle having surfaces which may contact to actuate the lever, means for turning the lever upon the spindle, and a cam rotatable by the machine and acting upon the governing member.

19. The combination with a shaft of a machine to be operated, of a clutch through which the shaft may be driven, shifting means for engaging the clutch, a member movable by the operator to positions for governing the engagement and disengagement of the clutch, means for temporarily securing the member in either position, a second operator-controlled member for governing the engagement and disengagement of the clutch, means for normally maintaining the second member in an ineffective position, and a unitary member engaging the clutch-shifting means and movable by both operator-controlled members.

ERNEST W. STACEY.